June 7, 1927.   B. DE MATTIA   1,631,855
TIRE BUILDING CORE
Filed Oct. 23, 1923
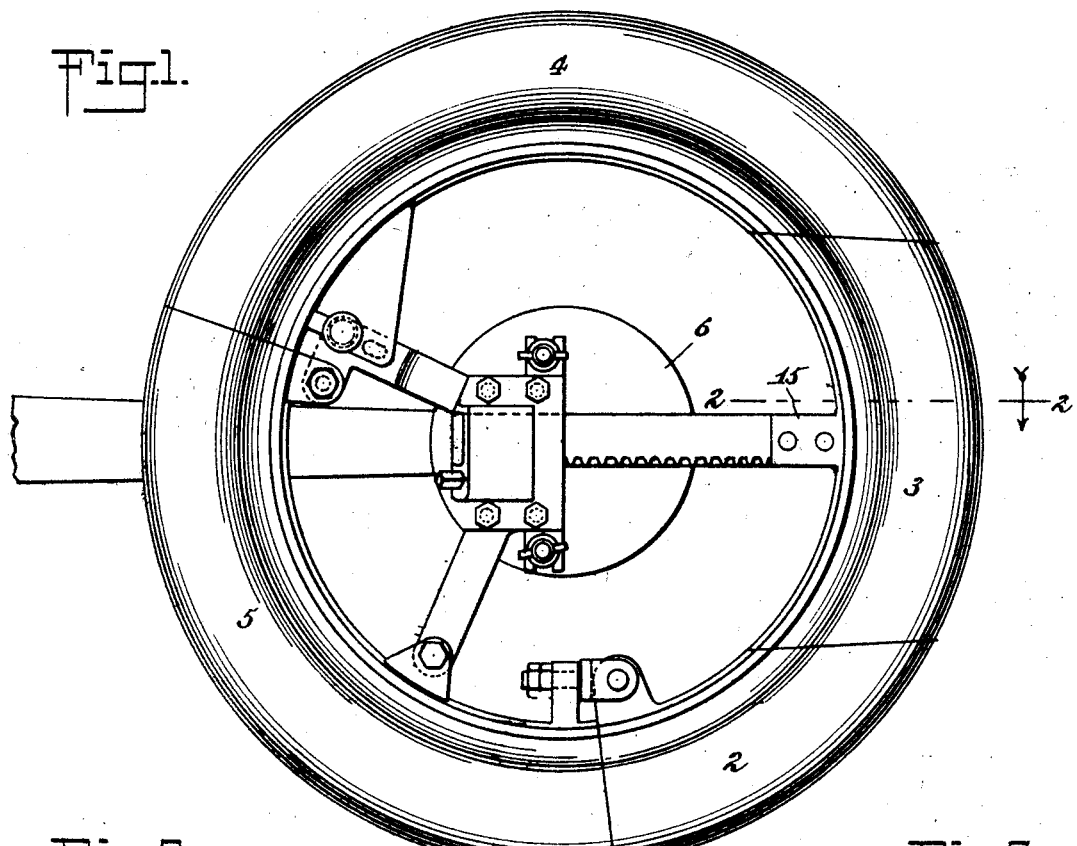
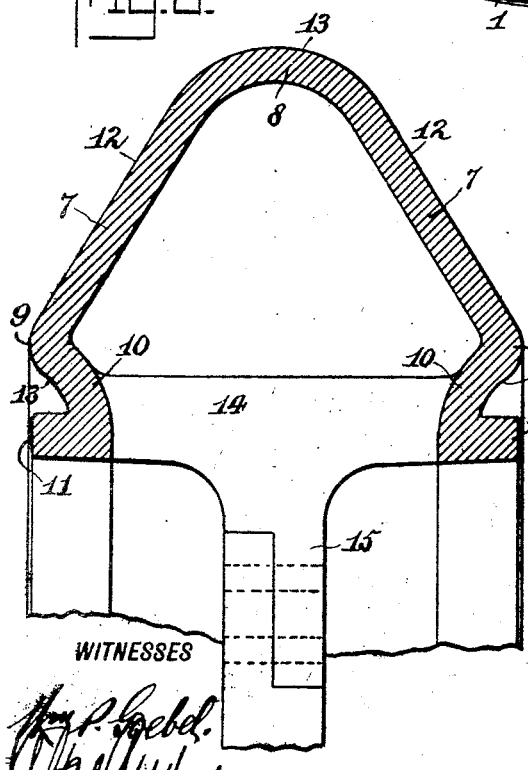
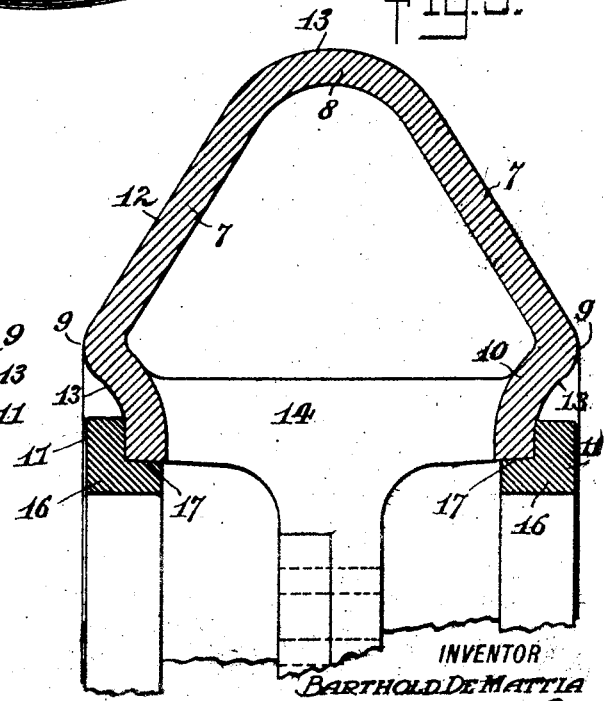
WITNESSES
INVENTOR
BARTHOLD DE MATTIA
BY
ATTORNEYS Patented June 7, 1927.

1,631,855

UNITED STATES PATENT OFFICE.

BARTHOLD DE MATTIA, OF CLIFTON, NEW JERSEY, ASSIGNOR TO DE MATTIA BROTHERS, INC., OF GARFIELD, NEW JERSEY, A CORPORATION OF NEW JERSEY.

TIRE-BUILDING CORE.

Application filed October 23, 1923. Serial No. 670,336.

The present invention relates to cores employed in the manufacture of shoes or casings for pneumatic tires, and it has for its object the production of a core of such a construction as to greatly facilitate the process of the building up of a shoe or casing thereon, and to practically do away with the extensive "stitching" operations which, with the cores as now made, are necessarily employed to dispose of the fullness in the tire fabric, and to properly shape and conform the fabric to the core.

As is well-known to those skilled in this art, the cores heretofore employed are substantially circular in cross section, or of that shape corresponding to the inner surface of a shoe or casing when expanded by an inner tube and in use. Because of this substantially circular cross-sectional shape of the core, the fabric which largely consists of a woven fabric cut on the bias so that the threads run diagonally across the fabric and in opposite directions in the super-imposed layers of fabric employed in building up the tire, it is quite readily drawn and stretched about the outer peripheral surface of the core corresponding to the tread portion of the tire, and it is quite readily caused to assume the proper shape about the outer peripheral surface or that portion of the core extending above an imaginary annular line located at which might be described as an equatorial line cutting the core between the inner and outer periphery.

Below that line however, it is quite difficult to shape and conform the fabric to the surface of the core because of the fullness of the fabric, and considerable manipulation is required to lay the fabric and to fold, press and shape it, such operation being known as "stitching," and requiring considerable machinery.

In the core shown in the accompanying drawing, I have so formed it in cross section as to provide a shaping surface, the greater portion of which is disposed above an annular horizontal line cutting the core at its widest part and thus materially reducing the surface below such line, and to such an extent that the small quantity of fabric below that line may be readily pressed into close contact with the core and the beads or edges formed without the necessity of employing an extensive "stitching" operation, and this for the reason that in this relatively reduced quantity of fabric below the widest part of the core there is very little fullness to take care of.

In my improved core there are provided above the widest part, two relatively inclined and converging shaping surfaces united at or near the outer peripheral portion by a curved crown or "tread," such shaping surfaces and curved crown corresponding in transverse area to the major portion of the shoe or casing to be constructed thereon, and below or within an annular line cutting the wider portion of the core is a bead-receiving and edge-shaping recess upon opposite sides, the base of which is formed by a bead-positioning shoulder, which may be an integral part of the core.

The present invention is illustrated in the accompanying drawing in which—

Fig. 1 shows a plan view of my improved core formed in segmental sections and mounted upon a chuck or carrier so that it may be expanded and collapsed as required.

Fig. 2 shows a view somewhat enlarged as compared with Fig. 1, and showing a cross section through the core upon a radial line.

Fig. 3 is a view similar to Fig. 2, of a modified form.

The core 1 may of course be formed of one continuous annular structure and is made preferably of cast iron; but as shown in Fig. 1 it is formed of a plurality of segmental sections 2, 3, 4 and 5 carried by a chuck 6, the chuck illustrated being substantially that shown in my Patent No. 1,389,440, dated August 30, 1921, to which reference may be had for an extended description of the operation of the chuck and core, it being sufficient here to state that sections 2, 3 and 4 are arranged to have movements in certain relation whereby the core sections may be collapsed or expanded as required. Obviously the chuck forms no part of the present invention, nor is the present invention limited to a core formed of segmental or other sections.

As shown in Figs. 2 and 3, the wall of the core is formed of two converging inclined members 7 which at the crown or peripheral portion are united by a laterally curved portion 8, and the greater portion of the core is disposed above rounded shoulders 9, the latter being positioned at the point of greatest width and near the lower edges. Below the shoulders 9 the walls of the core are extended downward and inward as at 10, and at their lower ends are provided with an annular flange 11 forming a bead or edge-shaping and positioning shoulder. The outer surface of the core provides two relatively long inclined tables or shaping surfaces 12, united by a curved shaping surface 13, and below the shoulders 9 merge into bead or edge-shaping surfaces 13, and as will be clear to one skilled in this art, the major portion of the shaping surface of the core is located above the shoulders 9, below which is a relatively small inwardly extending shaping surface.

By thus forming the core, the tire fabric can be quickly applied and caused to conform to the upper part of the core above the shoulders 9, and the relatively short portion of the fabric which extends below the shoulders 9 can be formed and turned inward with little effort and without, as before stated, employing extensive "stitching" and shaping operations. Preferably the core is made hollow and at intervals there will be cross braces 14 cast integrally with the core and, as indicated in the drawing, integral shanks 15 may be provided, or other means, for the purpose of attaching the core or core sections to a chuck or other support.

In the modified form shown in Fig. 3, the construction is exactly the same as that described, with the exception that the bead-supporting and edge-shaping shoulder 11 is formed with and constitutes a part of a flanged ring 16 provided with a recess 17 to receive the lower or inner peripheral edges of the core.

In the use of my improved core the tire fabric is applied thereto and shaped and conformed to that portion above the shoulders 9, and will thus have imparted to it a substantially triangular shape in cross section. After sufficient fabric has been applied and shaped, the beads are put in position and the lower edges of the fabric pressed inward beneath the shoulders 9. During this operation of course sufficient force is applied to properly press the fabric. Thereafter the tire or carcass is removed and placed in molds of the usual shape in cross section and expanded by an inner pneumatic or inflatable bag, or otherwise, so as to change the triangular shape in cross section to a substantially circular shape in cross section, and vulcanized and finished in the usual manner.

Incidentally I desire to call attention to the fact that, assuming that my invention is embodied in a collapsible core, which of course is the preferable manner of using it, the sections can be removed from the tire with very little distorting effect for the reason that the portion of the tire which must be expanded to permit the removal of the core comprises a relatively narrow portion adjacent to the inner edges.

I claim:

1. A tire building core having a shaping surface substantially triangular in cross section; outwardly projecting shoulders positioned upon opposite sides, and beneath the base of, the triangular portion; and undercut recesses, one beneath each of said shoulders, the lower face of each recess terminating in an outwardly projecting bead supporting flange, the extreme point of projection of each shoulder and the corresponding flange being in substantially the same plane.

2. A tire building core having a shaping surface substantially triangular in cross section, downwardly extending side walls at the base of said triangular cross section, and recesses in each side wall extending beneath the base of the triangular shaping surface of the core.

BARTHOLD DE MATTIA.